(12) United States Patent
Chen

(10) Patent No.: US 7,009,380 B2
(45) Date of Patent: Mar. 7, 2006

(54) INTERFACE DEVICE FOR PRODUCT TESTING

(75) Inventor: Chien-Hsu Chen, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 10/247,469

(22) Filed: Sep. 20, 2002

(65) Prior Publication Data

US 2003/0195716 A1    Oct. 16, 2003

(30) Foreign Application Priority Data

Apr. 10, 2002 (TW) .............................. 091107251 A

(51) Int. Cl.
*G01R 31/26* (2006.01)
*G06F 9/455* (2006.01)
*G06F 3/00* (2006.01)

(52) U.S. Cl. ..................... 324/158.1; 324/765; 703/21; 703/27; 710/11; 702/122

(58) Field of Classification Search ................. 703/27, 703/21; 709/230; 702/122, 81, 68, 188; 324/750–765, 158, 1, 158.1

See application file for complete search history.

(56) References Cited

U.S. PATENT DOCUMENTS

| | | | | |
|---|---|---|---|---|
| 5,027,343 A | * | 6/1991 | Chan et al. ................. | 370/250 |
| 6,038,400 A | * | 3/2000 | Bell et al. ..................... | 710/11 |
| 6,266,789 B1 | * | 7/2001 | Bucher et al. ................ | 714/39 |
| 6,311,149 B1 | * | 10/2001 | Ryan et al. ................... | 703/21 |
| 2002/0103612 A1 | * | 8/2002 | Szucs et al. ................. | 702/122 |

* cited by examiner

*Primary Examiner*—Vinh Nguyen
*Assistant Examiner*—Emily Y Chan
(74) *Attorney, Agent, or Firm*—Rosenberg, Klein & Lee

(57) ABSTRACT

The present invention system provides an interface device for product testing and is designed to shorten the operation time of product testing and enhance the flexibility of device interfacing. The interface device includes a physical layer (PHY) of a first transmission interface which is connected to a testing host through an interconnection line. A plurality of interconnecting devices are further provided for connection to the devices under testing (DUTs), and a protocol transform device is provided for connection to the PHY and the plurality of interconnecting devices. The protocol signal of the first transmission interface is transformed into the specific protocol signals of the various transmission interfaces and the first transmission interface supports plug-and-play and/or hot insertion.

1 Claim, 2 Drawing Sheets

INTERFACE DEVICE FOR PRODUCT TESTING

BACKGROUND OF THE INVENTION

1. Field of the Invention

The present invention generally relates to an interface device for product testing and, more particularly, to an interface device for product testing that shortens the operation time for product testing and enhances the flexibility so as to shorten the activation time of the product during testing and to augment the application range of the product.

2. Description of the Prior Art

In recent years, with the high development in electronic- and information-related industries, people have increasing needs for better performance of various electronic and information products. In view of this, the industries have made lots of efforts to develop various new products. These new products may, however, cooperate with different specifications from the conventional ones. It is inevitable that the new products with various specifications must be tested before they can be presented to the public. Therefore, product testing has become an important issue for the manufacturers.

Typically, a conventional on-line product testing system is as shown in FIG. 1, in which a computer 10 comprises a interface controller 14 corresponding to the interface specification of a PUT (product under test) 18 and an interconnecting device 16 for the interface. After the interconnecting device 16 is connected to the PUT 18, testing software 12 is executed by the computer 10 to perform testing procedures for the product. If the PUT 18 is a data storage device, for example, a hard disc or an optical drive, an IDE (integrated device electronics) controller is provided in the computer 10 and an IDE socket is also provided as an interconnecting device. Meanwhile, if the PUT 18 is an image processing device, for example, a printer or a scanner, an ISA (industry standard architecture) controller as well as a printer port is required. That is, a corresponding controller and a corresponding interconnecting device are required for any product with a certain specification.

However, the conventional product testing system may complete product testing with low efficiency and poor flexibility. More particularly, a typical computer comprises a limited number of devices and corresponding sockets. If the transmission specification of a PUT does not support PNP (Plug-and-Play) or hot insertion (also known as hot swapping or hot-plug), the computer of a product testing system must be rebooted every time a new product is to be tested. As a result, the application range of the product may not be augmented and the activation time of the product during testing can be prolonged.

Therefore, there is need in providing an interface device for product testing that shortens the operation time for product testing and enhances the flexibility so as to shorten the activation time of the product during testing and to augment the application range of the product.

SUMMARY OF THE INVENTION

Accordingly, it is the primary object of the present invention to provide an interface device for product testing, utilizing a transmission interface specification supporting PNP (Plug-and-Play) or hot insertion as well as a protocol transform device, such that the interface device is applicable to products of various transmission interface specifications.

It is a secondary object of the present invention to provide an interface device for product testing, utilizing a protocol transform device that is a non-volatile random access memory (NVRAM) comprising a protocol transform program, which can be updated and augmented by a testing host.

It is another object of the present invention to provide an interface device for product testing, utilizing a plurality of interconnecting devices, such that the interface device is connected to products of various transmission interface specifications.

In order to achieve the foregoing objects, the present invention provides an interface device for product testing, comprising: a PHY (physical layer) of a first transmission interface specification, connected to a testing host through an interconnection line; a plurality of interconnecting devices, provided for connecting to one of devices under testing (DUT's) of various transmission interface specifications, respectively; and a protocol transform device, connected to the PHY and the various DUT's, such that a protocol signal of the first transmission interface specification is transformed into a protocol signal of various transmission interface specifications; where the first transmission interface specification supports one of PNP (Plug-and-Play), hot insertion and a combination thereof.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention providing an interface device for product testing can be exemplified by the preferred embodiment as described hereinafter.

Figure 1:
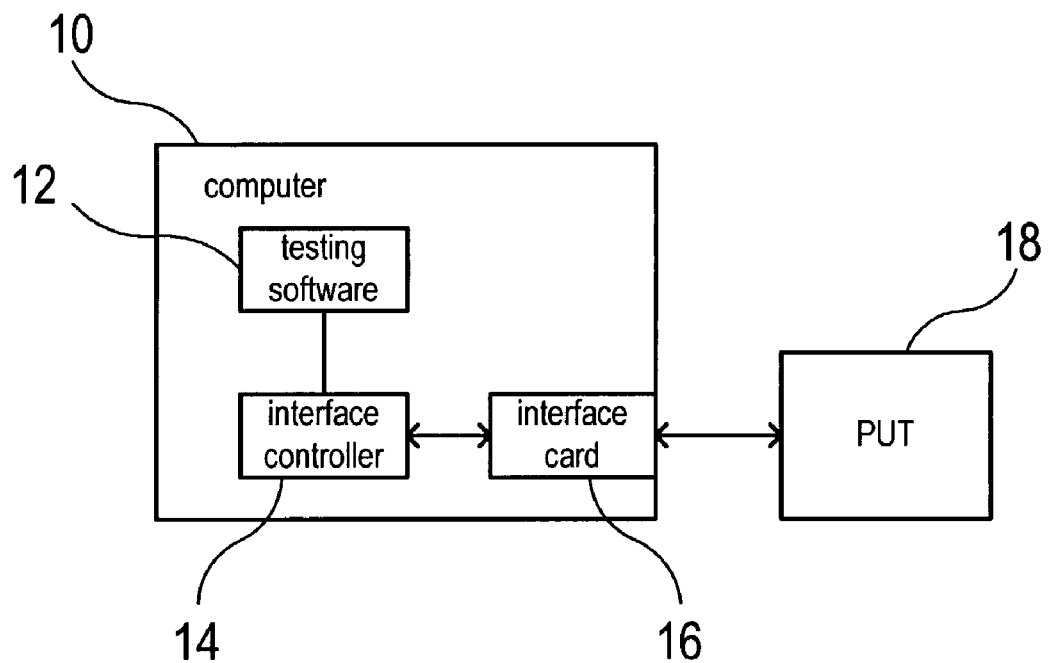
FIG. 1 is a block diagram schematically illustrating a conventional product testing system in accordance with the prior art.
Figure 2:
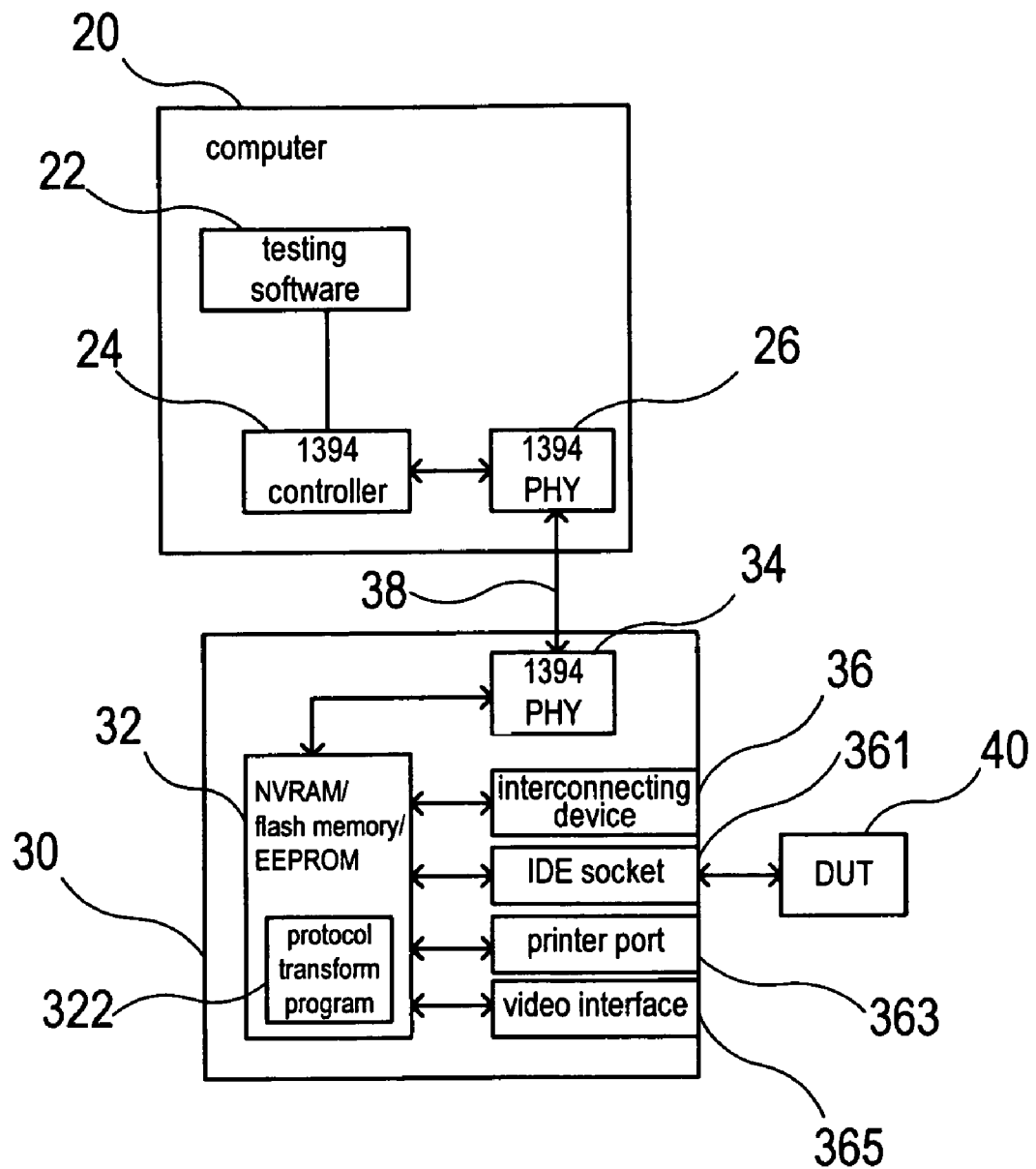
FIG. 2 is a block diagram schematically illustrating a product testing system in accordance with one preferred embodiment of the present invention.

To start with, please refer to FIG. 2, which is a block diagram schematically illustrating a product testing system in accordance with one preferred embodiment of the present invention. As shown in the figure, the interface device 30 according to the present invention comprises: a 1394 PHY (physical layer) 34; a protocol transform device 32 and a plurality of interconnecting devices 36 of various transmission interface specifications. The 1394 PHY 34 is connected to a computer 20 through an interconnection line 38. The plurality of interconnecting devices 36 are provided for connecting to devices under testing (DUT's) 40 of various transmission interface specifications, respectively. The protocol transform device 32 is connected to the 1394 PHY 34 and the plurality of interconnecting devices 36, such that a protocol signal of IEEE 1394 interface is transformed into a protocol signal of various transmission interface specifications.

In order to test a DUT 40, the computer 20 has to support IEEE 1394 interface so that the testing software 22 generates a testing signal transmitted through a 1394 controller 24 and a 1394 PHY 26 to the interface device 30 of the present invention. After the 1394 PHY 34 of the interface device 30 receives the signal, the protocol transform device 32 transforms the signal into a protocol signal of the transmission interface for the DUT 40, and then an interconnecting device corresponding to the transmission interface transmits the signal to the DUT 40.

IEEE 1394 interface supports PNP (Plug-and-Play) and hot insertion. Therefore, any of the various transmission interfaces, such as IDE interfaces, ISA interfaces, video interfaces and so on can be utilized as long as the interface device 30 of the present invention is provided with corresponding interconnecting devices, for example, IDE sockets, printer ports, video interfaces and so on, thereby being connected to the DUT 40. The interface device 30 is further connected to the computer 30 with IEEE 1394 interface through the protocol transform device 32. In this manner, even though the DUT 40 itself does not support PNP (Plug-and-Play) or hot insertion, the DUT 40 still can be plugged or inserted for testing without re-booting the system or re-installing the DUT when it is tested by using the testing system according to the present invention. In this regard, the time required for re-booting or re-installation can be saved and the number of required transmission interfaces can be reduced, such that both the operation time for product testing and fabrication cost are minimized.

Furthermore, the interface device according to the present invention can use USB (universal serial bus) as a transmission interface between the interface device and the computer. The protocol transform device 32 is implemented by using a non-volatile random access memory (NVRAM) comprising a protocol transform program. The non-volatile random access memory can be implemented by using one of a flash memory and an electrically erasable programmable read-only memory (EEPROM). Therefore, when a new product employs a new transmission interface specification or when the transmission interface specification is updated, the protocol transform program in the memory can be modified, updated, or augmented, such that a new product can be tested with high efficiency and augmented flexibility.

As further shown in FIG. 2, the plurality of interconnecting devices 36 may include an IDE socket 361, a printer port 363, and a video interface 365. The interconnecting devices may take any form, however, these devices shown in FIG. 2 are merely for exemplary purposes. Additionally, the protocol transform device 32 is implemented using a non-volatile random access memory, as described above, further comprising a protocol transform program 322.

Furthermore, the interface device according to the present invention is able to connect to various devices of different transmission interfaces through a transmission interface. Therefore, the interface device can also function as an augmented interface of a computer.

According to the above discussion, it is apparent that the present invention discloses an interface device for product testing that shortens the operation time for product testing and enhances the flexibility so as to shorten the activation time of the product during testing and to augment the application range of the product. Therefore, the present invention has been examined to be progressive, advantageous and applicable to the industry.

Although this invention has been disclosed and illustrated with reference to a particular embodiment, the principles involved are susceptible for use in numerous other embodiments that will be apparent to persons skilled in the art. This invention is, therefore, to be limited only as indicated by the scope of the appended claims.

What is claimed is:

1. An interface device for testing products of different communication protocol type, comprising:
    a testing host computer having a first physical layer of a first transmission interface specification;
    a second physical layer of said first transmission interface specification connected to said testing host computer through an interconnection line for bidirectional communication therebetween;
    a selectable plurality of different interconnecting devices respectively connected to a plurality of devices under testing, said plurality of devices under testing respectively having a plurality of different transmission interface specifications respectively associated therewith; and
    a protocol transform device in direct electrical communication with said second physical layer and said plurality of interconnecting devices, said protocol transform device including a non-volatile random access memory for transforming a protocol signal of said first transmission interface specification into protocol signals of each of said plurality of different transmission interface specifications and protocol signals of each of said plurality of different transmission interface specifications being transformed thereby into protocol signals of said first transmission interface specification, wherein said first transmission interface specification supports Plug-and-Play and hot insertion and any of said plurality of devices under testing are connectable to a corresponding one of said plurality of different interconnecting devices without rebooting said testing host computer, said protocol transform device being located separate from said testing host computer and being in electrical communication therewith.

* * * * *